United States Patent
Covell et al.

(10) Patent No.: US 10,360,126 B2
(45) Date of Patent: *Jul. 23, 2019

(54) RESPONSE-TIME BASELINING AND PERFORMANCE TESTING CAPABILITY WITHIN A SOFTWARE PRODUCT

(71) Applicant: International Business Machines Corporation, Armonk, NY (US)

(72) Inventors: Grant C. Covell, Belmont, MA (US); David J. Schlegel, Needham, MA (US); Paul W. Weiss, Boylston, MA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/887,055

(22) Filed: Feb. 2, 2018

(65) Prior Publication Data

US 2018/0157573 A1  Jun. 7, 2018

Related U.S. Application Data

(63) Continuation of application No. 14/844,657, filed on Sep. 3, 2015, now Pat. No. 9,910,756.

(51) Int. Cl.
*G06F 11/34* (2006.01)
*G06F 11/36* (2006.01)

(52) U.S. Cl.
CPC ...... *G06F 11/3409* (2013.01); *G06F 11/3414* (2013.01); *G06F 11/3419* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| 6,564,342 B2 * | 5/2003 | Landan | G06F 11/323 |
| | | | 709/224 |
| 8,464,219 B1 | 6/2013 | Wilkerson | |
| 8,464,224 B2 | 6/2013 | Dulip | |

(Continued)

OTHER PUBLICATIONS

Vanitha et al. "Software testing in cloud platform: a survey." International Journal of computer applications 46.6 (2012): 21-25. Retrieved on [Feb. 12, 2019] Retrieved from the Internet:<https://pdfs.semanticscholar.org/7451/421247490e66a9b244bb0eb3a2aee59b0bc7.pdf> (Year: 2012).*

(Continued)

*Primary Examiner* — Thuy Dao
*Assistant Examiner* — Cheneca Smith
(74) *Attorney, Agent, or Firm* — Richard Wilhelm; Edell, Shapiro & Finnan, LLC

(57) ABSTRACT

A method of measuring performance of a computerized system is provided. A test component integrated in a client application module is configured to generate an application specific workflow to be delivered to a computing environment of one or more computing devices for measuring the performance of the computerized system. The integrated test component of the client application module is executed to deliver the application specific workflow to a server system in the computing environment. Performance data is collected based on at least one response received from the computing environment to measure the performance of the computerized system.

20 Claims, 8 Drawing Sheets

(56) References Cited

U.S. PATENT DOCUMENTS

| | | | |
|---|---|---|---|
| 8,739,154 B2 | 5/2014 | Thirumalai et al. | |
| 9,058,428 B1 | 6/2015 | Siddiqui | |
| 9,098,636 B2* | 8/2015 | De Angelis | G06F 11/3688 |
| 9,148,304 B2 | 9/2015 | Smith | |
| 2002/0138226 A1* | 9/2002 | Doane | G06F 11/2294 |
| | | | 702/119 |
| 2006/0129992 A1 | 6/2006 | Oberholtzer | |
| 2006/0259828 A1 | 11/2006 | Swoboda | |
| 2008/0271025 A1* | 10/2008 | Gross | G06F 11/3051 |
| | | | 718/102 |
| 2009/0089320 A1 | 4/2009 | Tendler | |
| 2009/0199160 A1* | 8/2009 | Vaitheeswaran | G06F 11/3414 |
| | | | 717/124 |
| 2010/0333072 A1 | 12/2010 | Dulip | |
| 2011/0145795 A1 | 6/2011 | Khanapurkar | |
| 2012/0017112 A1 | 1/2012 | Broda | |
| 2013/0124610 A1 | 5/2013 | Smith | |
| 2013/0152047 A1* | 6/2013 | Moorthi | G06F 11/368 |
| | | | 717/124 |
| 2013/0262931 A1 | 10/2013 | Siddalingesh | |
| 2014/0006000 A1 | 1/2014 | Said et al. | |
| 2014/0068563 A1 | 3/2014 | Saltzman et al. | |
| 2014/0325481 A1* | 10/2014 | Pillai | G06F 11/3409 |
| | | | 717/124 |
| 2015/0169434 A1* | 6/2015 | De Angelis | G06F 11/3688 |
| | | | 717/126 |
| 2017/0068608 A1 | 3/2017 | Covell | |

OTHER PUBLICATIONS

Babbar et al. "Web Application Performance Analysis based on Component Load Testing." International Journal of Technology and Applied Science 2 (2011): 22-28. Retrieved on [Feb. 12, 2019] Retrieved from the Internet: URL<http://ijcttjournal.org/Volume1/issue-1/ijcttjournal-v1i1p11.pdf> (Year: 2011).*

Jin et al. Performance Evaluation and Prediction for Legacy Information Systems.29th international conference on software engineering, 2007, Retrieved on Oct. 14, 2017, Retrieved from the Internet: URL<http://ieeexplore.ieee.org/document/4222615/#full-text-section>, 10 pages.

Hill, James H., et al. "CiCUTS: combining system execution modeling tools with continuous integration environments." Engineering of Computer Based Systems, 2008. Retrieved on [Oct. 14, 2017] Retrieved from the Intern et: URL <http://ieeexplore.ieee.org/abstract/document/4492388/>, 10 pages.

List of IBM Patents or Patent Applications Treated as Related, Feb. 2018, 1 page.

* cited by examiner

RESPONSE-TIME BASELINING AND PERFORMANCE TESTING CAPABILITY WITHIN A SOFTWARE PRODUCT

CROSS-REFERENCE TO RELATED APPLICATIONS

This application is a continuation of U.S. patent application Ser. No. 14/844,657, entitled "RESPONSE-TIME BASELINING AND PERFORMANCE TESTING CAPABILITY WITHIN A SOFTWARE PRODUCT" and filed Sep. 3, 2015, now U.S. Pat. No. 9,910,756, the disclosure of which is incorporated herein by reference in its entirety.

BACKGROUND

1. Technical Field

Present invention embodiments relate to software performance testing, and more specifically, to software performance testing capabilities built in a software product.

2. Discussion of the Related Art

Computer systems employing multi-tier software products typically include combinations of databases, web application servers and client devices on which client software is executed. Multi-tier software products may support a variety of different operating systems and databases and as a result, environments in which multi-tier software products are installed may differ significantly from each other which can make troubleshooting of customer-reported problems difficult. In particular, in the case where problems are in the domain of performance (e.g., the performance of a computing system is too slow either in single-user situations or under load from multiple users), the uniqueness of the customer's databases, hardware and network environments can make problem diagnosis a time-consuming effort as each aspect of the configuration needs to be isolated and analyzed.

In addition, in a typical environment in which multi-tier software products are employed, not only databases, hardware and network environments may differ from each other but also different types of data and different workflows can make comparisons of captured performance data and related analysis difficult.

One approach to capture the customer performance data for further analysis is to execute software performance testing tools at a customer site at which the multi-tier software products are installed.

Using these separate software performance testing tools requires complex and domain-specific skills. Within the development environment, performance testing usually requires dedicated software applications as well as additional dedicated hardware. Installing the specific software performance testing tools and the additional dedicated hardware for testing purposes is often difficult and time consuming, as well as expensive.

SUMMARY

According to one embodiment of the present invention, a method of measuring performance of a computerized system is provided. A test component integrated in a client application module is configured to generate an application specific workflow to be delivered to a computing environment of one or more computing devices for measuring the performance of the computerized system. The integrated test component of the client application module is executed to deliver the application specific workflow to a server system in the computing environment. Performance data is collected based on at least one response received from the computing environment to measure the performance of the computerized system.

BRIEF DESCRIPTION OF THE DRAWINGS

Generally, like reference numerals in the various figures are utilized to designate like components.

DETAILED DESCRIPTION

When customer support personnel or performance engineers responsible for a computerized system that utilizes multi-tier software products are confronted with a customer's statement that "performance of the computerized system is slow," one first step to resolve the issue may be to compare the customer's performance for a set of transactions or operations against a known baseline for the given computer environment. In this regard, a vendor's test environment or a benchmarking environment may serve as the known baseline. Sometimes these comparisons may take the form of "How long does Task A take?" which can be an unscientific and unrepeatable process as end-users may only be able to time their transaction based on wall clocks or stopwatches. Not only are hardware, databases and networks unique variables in each installation, but data and workflow are also customer-specific which can make comparisons and analysis very difficult.

Figure 6:
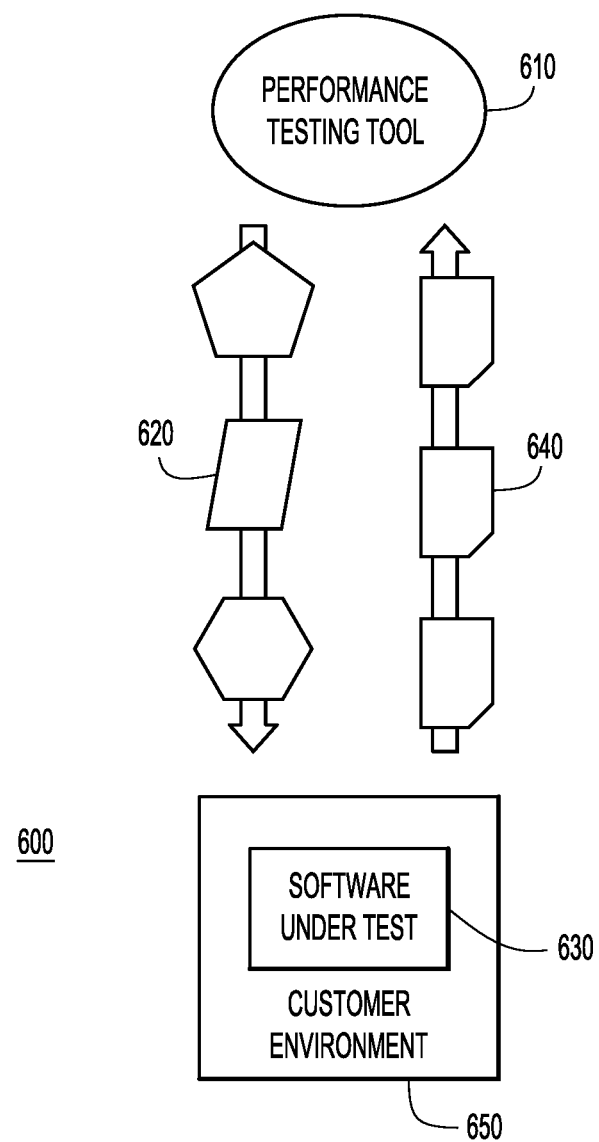
FIG. 6 is a diagrammatic illustration of a testing environment for performance testing of software according to an example embodiment of the present invention.

FIG. 6 illustrates a testing environment 600 for performance testing of software according to an aspect of the present invention. The testing environment may be set up in a testing laboratory. Separate software performance testing tools, such as performance testing tool 610 shown in FIG. 6, may be used during the software development process in the laboratory testing environment. Performance testing tool 610 in FIG. 6 is run on hardware separate from customer environment 650 on which software under test 630 is installed. A test designer defines simulated workload 620 which is sent to software under test 630. The simulated workload includes data, a number of simulated users, a frequency and an amount of simulated workload, etc. Variables in this approach include all the aspects of the customer environment (hardware, database, network, etc.) as well as the aspects of the workload (data shape, workload, workload rate, etc.). The results 640 of the generated workload are sent back to performance testing tool 610 and are analyzed by performance testing tool 610.

Test results from tests performed in a laboratory environment such as test environment 600 may significantly differ from test results generated in a real "live" computer system. In particular, by using laboratory workload generation techniques and utilizing a test component integrated in a client application of an active "live" system to generate an application specific workflow, specialized software, hardware and domain skills are not necessary anymore. In addition, this approach allows to easily, repeatedly and reliably undertake a basic level of response-time measuring and performance testing analysis. The built-in performance test capability leverages the existing deployed "live" computer environment, and a performance test can be run from one of the already established client systems or endpoints.

Methods and systems are provided to capture performance data of a computerized system by integrating a test component in a multi-tier software application under test to generate an application specific workflow in an active "live" environment. The application specific workflow is delivered by the application to the computerized system. The computerized system may be a single server system or a complex system that includes a plurality of components, including multiple servers, databases, etc. Data received by the application from the computerized system in response to service requests is analyzed to measure the performance to the computerized system. Service requests are generated as part of the application specific workflow.

According to an aspect of the present invention, as discussed above, workload generation techniques used in a laboratory environment such as test environment 600 may be used to generate the application specific workflow by the application under test in the "live" environment.

For example, the application specific workflow may be pre-defined to mimic input patterns of users that typically use the computerized system. It is also possible to mimic various behaviors of users in typical static or varying workload situations. In addition, the integrated test component of the client application may be parametrizable. By using an integrated test component, the application specific workload can be standardized, i.e., the simulated application specific workload may include standardized definitions of test data, number of simulated users, frequency and amount of simulated workload, etc. As a result, a completely compiled and configurable workload generation model using the actual code paths as triggered by a human user is created except that in this case, the workload generation is triggered by an integrated test component or built-in workload generator.

The application specific workflow may be generated in the "live" system under normal operating conditions. In other words, the application specific workflow may be delivered to the computerized system in addition to the "live" workflow, i.e., the workflow of normal operations generated by the application under test during normal operation.

The application under test may be a simple telephone system that may have the ability to test connectivity to the telephone system. The application under test may also involve a ticket entry system or an airplane reservation system. Typically, such computerized systems provide a plurality of choices that a user can make. Certain patterns of user behavior of making choices at a typical workload may be determined and mimicked by the test component to mimic the input pattern of the user.

Figure 1:
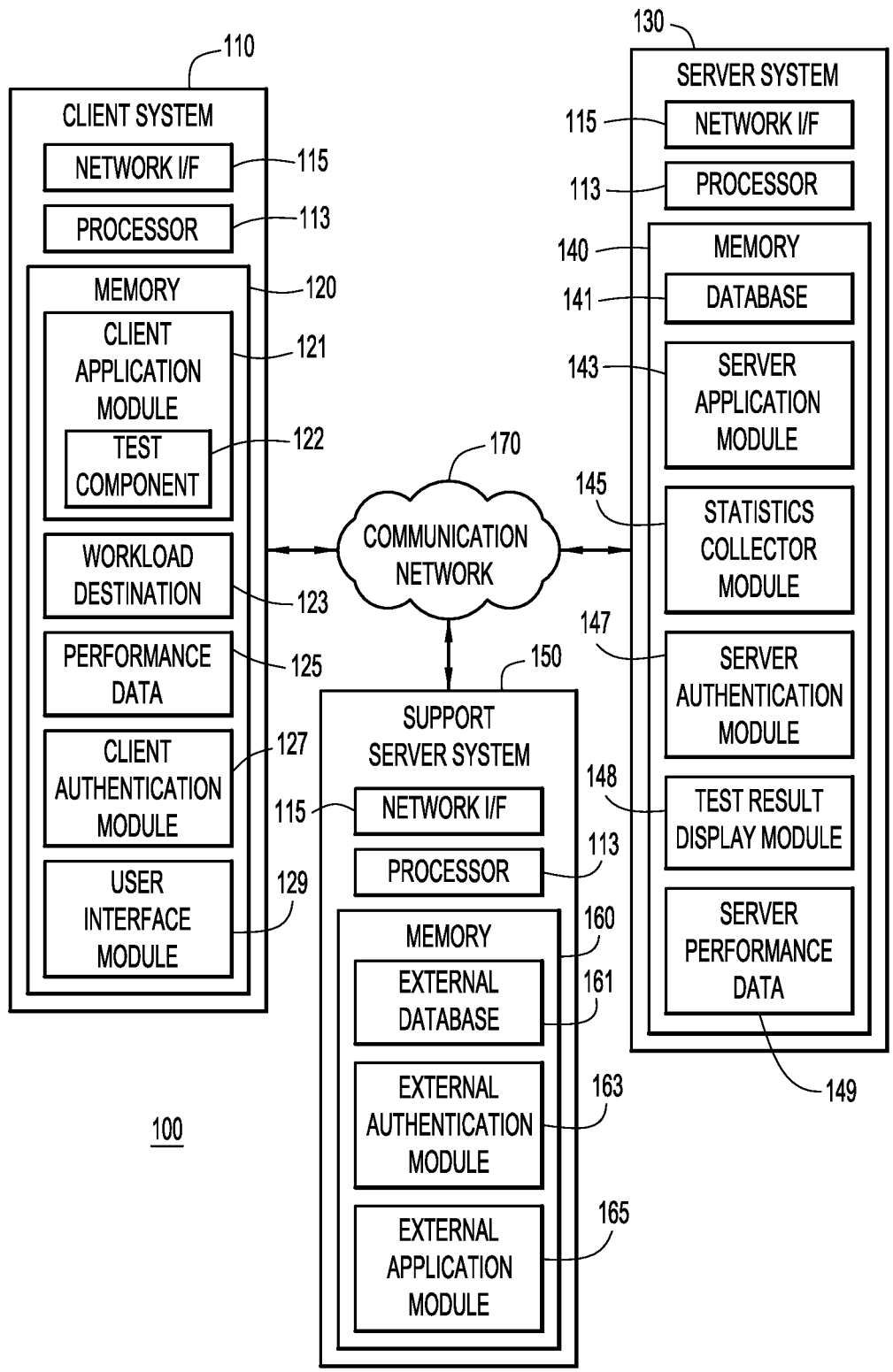
FIG. 1 is a diagrammatic illustration of an example computing environment for use with an example embodiment of the present invention.
Figure 2:
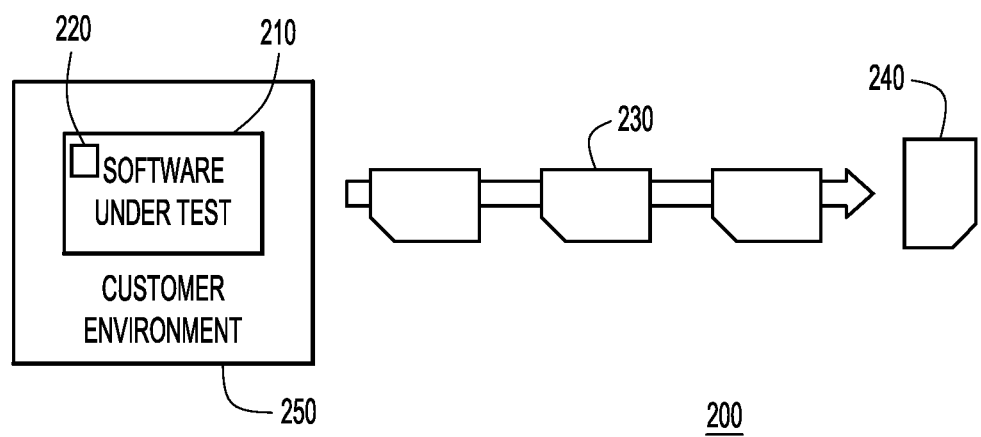
FIG. 2 is a diagrammatic illustration of a test component built in software under test according to an example embodiment of the present invention.

An example computer system 100 for use with present invention embodiments is illustrated in FIG. 1. A more general view of a multi-tier software application with a built-in test component that utilizes computer system 100 is shown in FIG. 2.

Specifically, computer system 100 may include one or more client systems 110, one or more server or end-user systems 130 and one or more support server systems 150.

Portions of multi-tier software are installed on each of the client systems 110, the server system 130 and the support server systems 150, to form multi-tier software products that combine databases, web applications, client software, etc.

According to an aspect of the present invention, the functionalities of support server system 150 may be entirely implemented in server system 130 so that support server system 150 may be omitted and the computer system 100 may include client system 110, server system 130 and communication network 170.

According to another aspect of the present invention, depending on the complexity of the multi-tier software products, a plurality of support server systems 150 may be required to separately perform specific functions of the multi-tier product such as presentation of information related to the multi-tier product, processing commands, making logical decisions and evaluations, performing calculations, moving processing data between processing devices, and querying a database.

Client systems 110, server systems 130 and support server systems 150 may be remote from each other and communicate over a network 170. The network may be implemented by any number of any suitable communications media (e.g., wide area network (WAN), local area network (LAN), Internet, Intranet, etc.). Alternatively, client systems 110, server systems 130 and support server systems 150 may be local to each other, and communicate via any appropriate local communication medium (e.g., local area network (LAN), hardwire, wireless link, Intranet, etc.).

Client systems 110 enable users to submit service requests to server systems 130. In response to the service requests, server system 130 sends a response back to client system 110 with content that depends on the particular service request and within a certain response time.

Client systems 110, server systems 130 and support server systems 150 may be implemented by any conventional or other computer systems preferably equipped with a display or monitor, a base (e.g., including at least one processor 113, one or more memories 120, 140 and 160 and/or internal or external network interfaces or communications devices 115 (e.g., modem, network cards, etc.)), optional input devices (e.g., a keyboard, mouse or other input device), and any commercially available and custom software (e.g., server/communications software, browser/interface software, etc.).

In memory 120 of client system 110, client application module 121, workload definitions 123, performance data 125, client authentication module 127, and user interface module 129 are stored. In memory 140 of server system 130, database 141, server application module 143, statistics collector module 145, server authentication module 147, test result display module 148, and server performance data 149 are stored.

Client application module 121 may be a portion of software 210 under test that is depicted in FIG. 2, or may entirely correspond to the software under test 210. Test components 220 of the software under test 210 in FIG. 2 that correspond to test component 122 in FIG. 1 may include workload definitions, such as work load definition 123 shown in FIG. 1. In response to the predefined workload generated by test component 220 in FIG. 2, test results 230 are collected and aggregated test results 240 are analyzed. Software under test 210 is pre-compiled and part of the multi-tier client-server software when it is installed.

Software under test 210 can be any type of multi-tier application, such as a fully coded client-server application, a web-based application or a cloud application. Typically, when the software under test 210 is installed, a driver component is also installed and an application programming interface (API) is provided that can be used to execute integrated test components 220 (test component 122 in FIG. 1).

Returning to FIG. 1, database 141 on server system 130 may store various information used to respond to the service requested by client system 110. In addition to database 141, external database 161 stored in memory 160 of support server system 150 may be queried by server application module 143 of server system 130 in response to a service request from client system 110.

Databases 141 and 161 may be implemented by any conventional or other database or storage unit, may be local to or remote from server systems 130 and support server systems 150 and client systems 110, and may communicate via any appropriate communication medium (e.g., local area network (LAN), wide area network (WAN), Internet, hardwire, wireless link, Intranet, etc.). Client system 110 may present a graphical user interface (e.g., GUI, etc.) when executing user interface module 129 or other interface (e.g., command line prompts, menu screens, etc.) to solicit information from users pertaining to client application module 121, and in particular, to the configuration of test component 122 integrated in client application module 121.

Client application module 121, client authentication module 127, user interface module 129, server application module 143, server authentication module 147, statistics collector module 145, test result display module 148, external authentication module 163 and external application module 165 may include one or more modules or units to perform the various functions of present invention embodiments described below. The various modules (e.g., client application module 121, client authentication module 127, user interface module 129, server application module 143, statistics collector module 145, server authentication module 147, test result display module 148, external authentication module 163 and external application module 165) may be implemented by any combination of any quantity of software and/or hardware modules or units, and may reside within memories 120, 140 and 150 of client system 110, server system 130 and support server system 150 for execution by processors 113.

Figure 3:
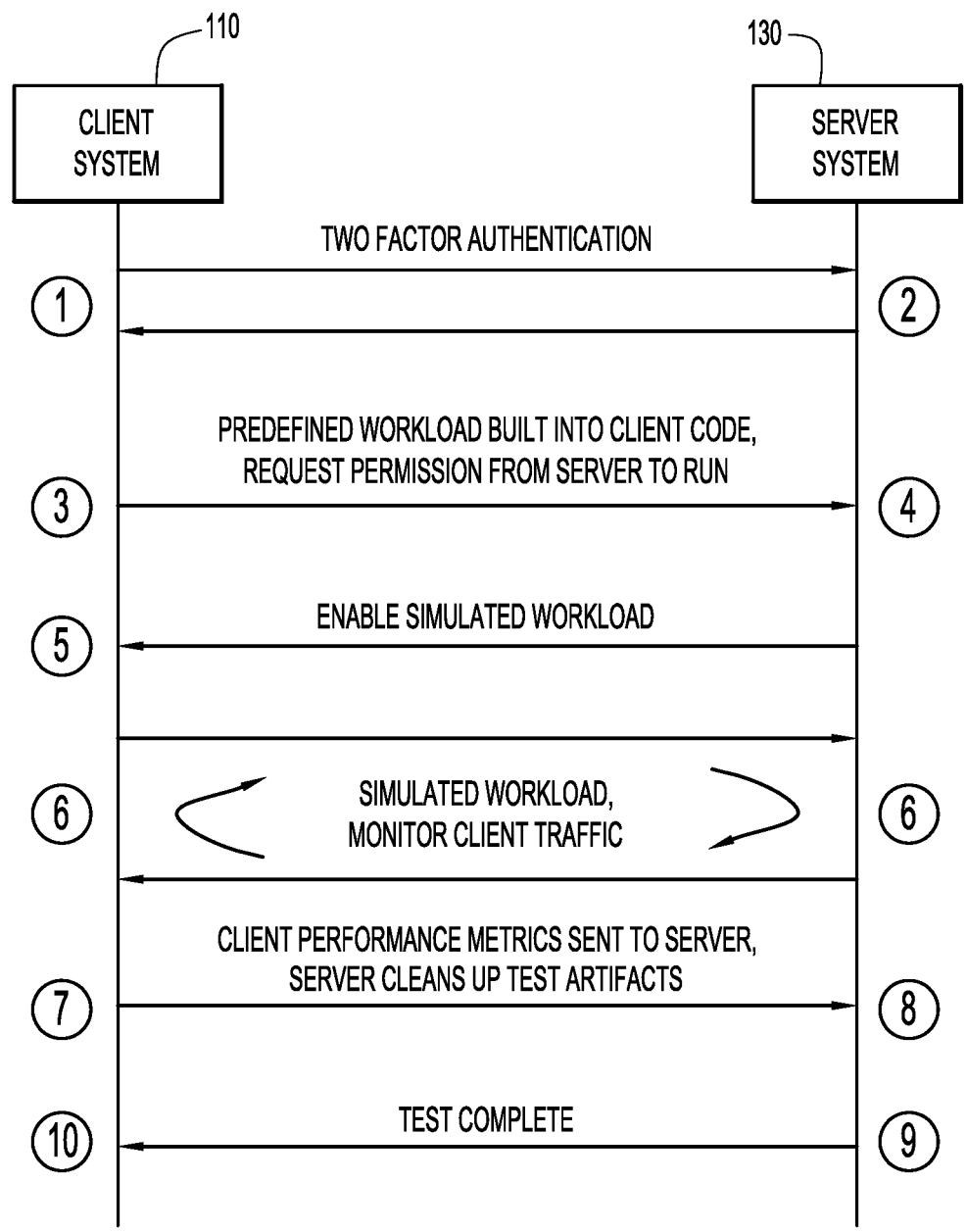
FIG. 3 is a diagrammatic illustration of interactions between the client system and the server system according to an example embodiment of the present invention.

With reference to FIG. 3, a diagrammatic illustration of interactions between the client system and the server system is now described according to an example embodiment of the present invention.

At processing stage 1, client authentication module 127 of client system 110 sends an authentication request as part of a security/registration process to server system 130. The security/registration process permits test component 122 of client application module 121 of client system 110 to communicate with server system 130 and to deliver the application specific workflow to server system 130. Although not shown in FIG. 3, the security/registration process can also be controlled by external authentication module 163 of support server system 150, i.e., it may be external to server system 130.

At processing stage 2, server authentication module 147 of server system 130 receives the authentication request, grants permission and sends an authentication response back to client system 110. In particular, a security or license validation and registration scheme with a two-factor authentication pattern is employed in which both server system 130 and client system 110 are authorized to execute the performance testing capability. This scheme may be initiated manually by an operator with both software program and server/hardware permissions.

At processing stage 3, test component 122 of client system 110 sends a request to server system 130 to obtain permission to perform a run test which is received by server system 130 at processing stage 4. In response, server system 130 sends a message back to client system 110 thereby enabling the client system 110 to simulate the workload. This message is received by client system 110 at processing stage 5.

Simulating the workload may include simulating a distance between computing devices such as client system 110 and server system 130. In particular, simulating the workload may be done to simulate the environmental behavior of the application under test which depends on latency, bandwidth and anomalies within the computing environment that are out of control of the application under test.

At processing stage 6, test component 122 of client application module 121 generates application specific workload thereby initiating a plurality of transactions and operations performed by server system 130. For example, test component 122 may create parametrized lists or code calls and send these calls to server system 130. By sending the parametrized lists or code calls to the server system 130, the workload is created. Typically, server system 130 is not aware that it is under test and responds to the service requests or code calls as if these calls were "live" code calls.

As a result, in response to the workload generated by test component 122 of client application module 121, server system 130 sends back responses to client application module 121 where performance metrics are collected. At processing stage 7, test component 122 sends the collected performance metrics (performance data 125) to statistics collector module 145 of server system 130. At processing stage 8, statistics collector module 145 cleans up test artifacts contained in the performance metrics data received from test component 122 of client system 110. At processing stage 9, server system sends a test complete message to client system 110 which is received by client system 110 at processing stage 10.

Figure 4:
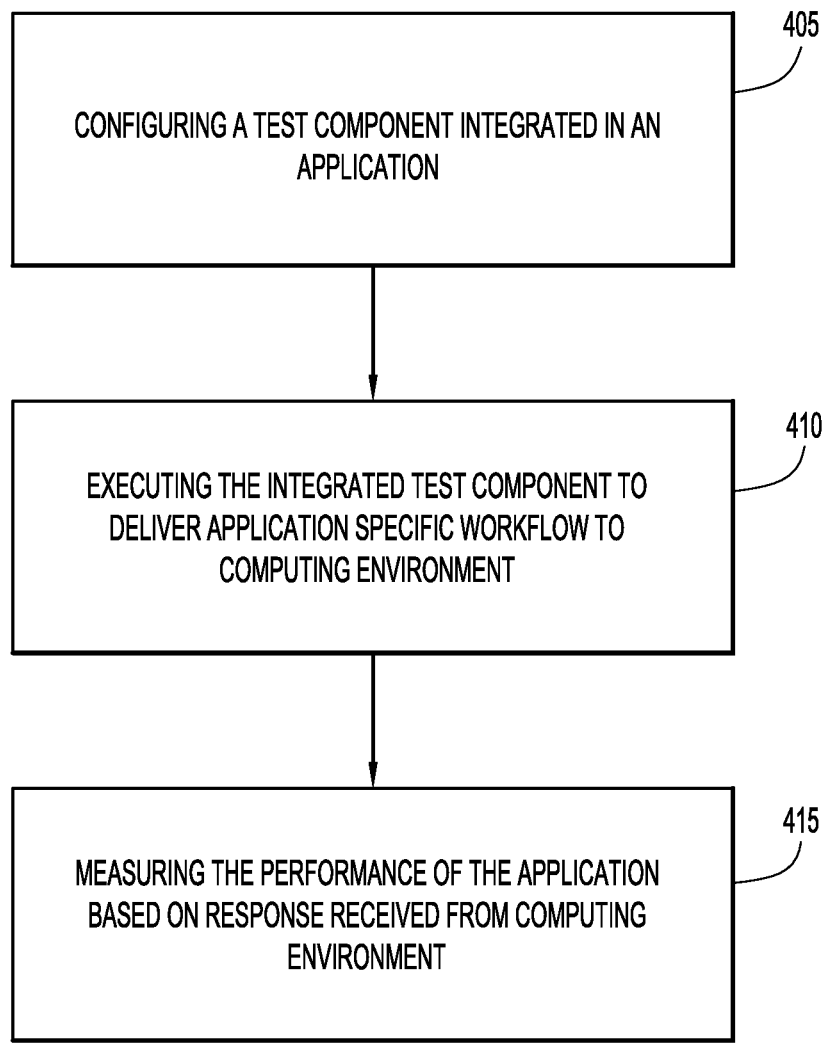
FIG. 4 is a generalized procedural flow chart illustrating a manner in which performance of a computerized system is measured according to an example embodiment of the present invention.

A manner in which performance of a computerized system is measured according to an example embodiment of the present invention is illustrated in FIG. 4 with reference to FIGS. 1-3.

Initially, at step 405, test component 122 that is integrated into client application module 121 is configured. At this step, parameters around the mechanics of executing the test can be set. After successfully performing security check/registration validation in processing stages 1-5 in FIG. 3, interface module 129 of client system 110 provides an interface, such as workload parametrization window 700 depicted in FIG. 7, in which one or more application workflows are listed and in which the user has the option to change parameters associated with these workflows. As described above, these application specific workflows are built into software application module 121 and represent common and basic application workflows.

At step 410, integrated test component 122 is executed to deliver application specific workload to the computing environment. In particular, test component 122, i.e., the built-in performance test capability may use the API to execute the workflow with a predefined test ID (or an ID configured by the operator).

The workload is delivered to the computing environment in a repeatable and consistent manner, i.e., workload is delivered repeatedly (looped) and/or at specific intervals (set frequency). Both the repetition and specific schedule are well-suited to an automated test where consistent execution is desired in order to produce a correspondingly consistent result set of significant enough samples.

At step 415, performance data is collected by test component 122 to measure the performance of the computerized system. The performance of the application is generally measured based on responses received from the server system 130 as part of the computing environment. The performance of the application may be measured in several ways. For example, test component 122 may measure the time between sending a request and receiving a response from the server system 130.

According to an example embodiment of the present invention, several ways to monitor/present the test results may be provided. It is possible to present test results while a test is running (including to stop or pause while the test is in progress). Test results may also be saved externally for viewing, analysis or processing in another system. Test results may not only be based on responses received by test component 122 from server system 130. Instead, statistics collector module 145 of server system 130 may also collect actual server performance data which may be correlated with the performance data collected by the client system 110. As a result, it may be determined whether the system is under stress, whether there are issues related to the computer environment, etc.

Test component 122 may be run as a single-user gauge client which would be a small footprint, non-intrusive way to repeatedly execute a basic transaction and gauge how that transactions' response time changes during normal working hours.

Figure 5:
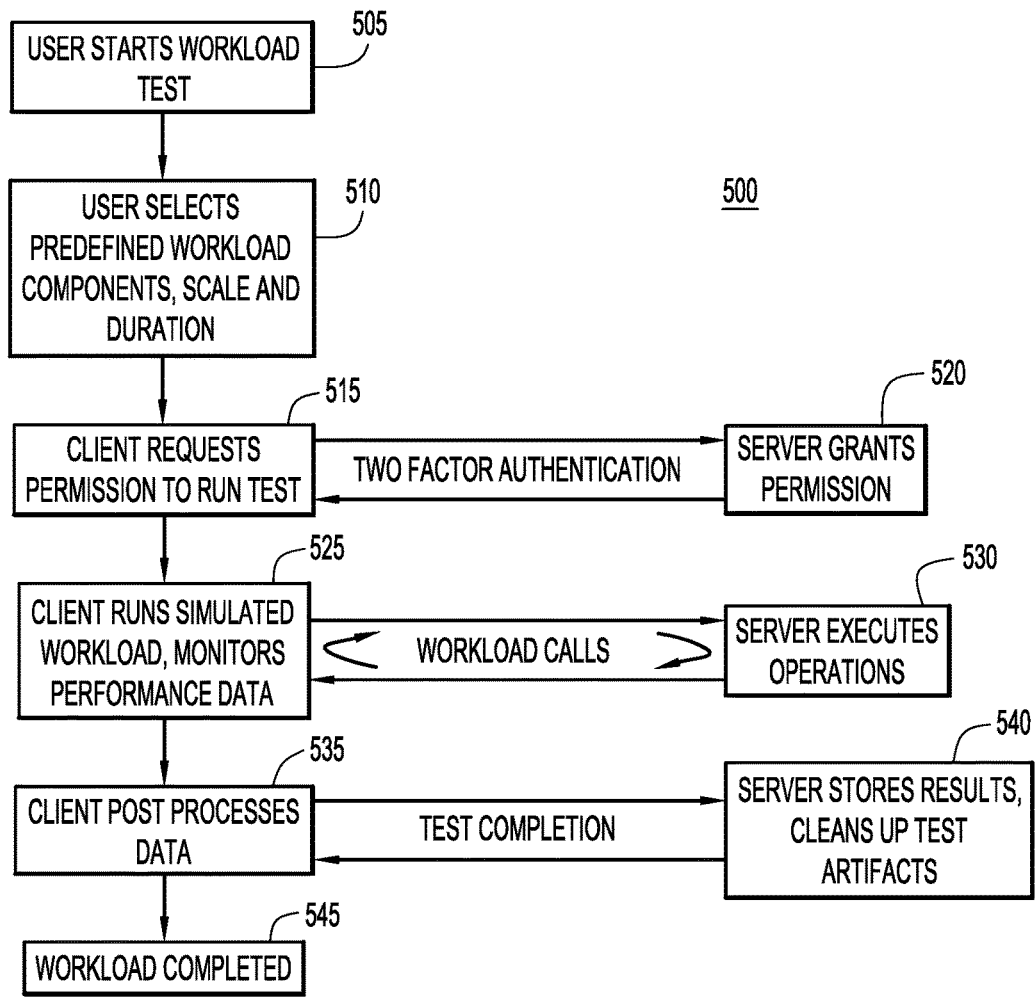
FIG. 5 is a procedural flow illustrating operations performed by and interactions occurring between the client system and the server system when performance of the computerized system is measured according to an example embodiment of the present invention.

FIG. 5 is a procedural flow illustrating operations performed by and interactions occurring between the client system and the server system when performance of the computerized system is measured according to an example embodiment of the present invention.

At step 505, a user starts a workload test. At step 510, an interface may be presented to the user in which the user selects predefined workload components, scale and duration.

At step 515 which corresponds to processing stage 1 in FIG. 3, test component 122 requests permission to run the workload test which is granted by server system 130 at step 520, which corresponds to processing stage 2 in FIG. 2.

At step 525, test component 122 of client application module 121 generates application specific workload by sending service requests to server system 130 which are executed by server system 130 at step 530.

At step 535, test component 122 post processes the collected performance metrics data 125 and sends it to server system 130 which, at step 540, cleans up test artifacts and stores the performance metrics data in database 141 thereby resetting the test system to a state before the test begun.

After storing the performance metrics data in database 141, server system 130 sends a test complete message to test component 122 of client application module 121 and at step 545, test component 122 completes the workload test.

Figure 7:
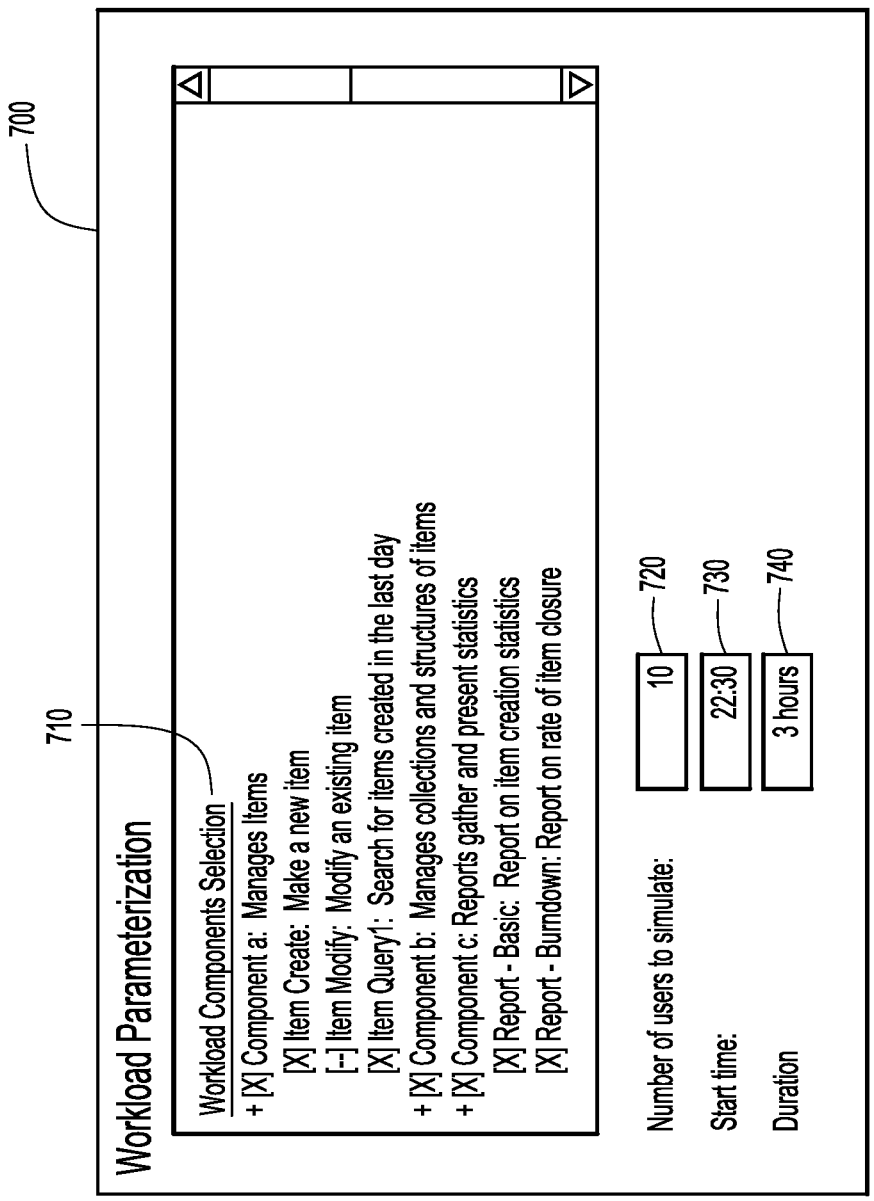
FIG. 7 is an illustration of a workload parametrization window according to an example embodiment of the present invention.

FIG. 7 is an illustration of workload parametrization window 700 according to an example embodiment of the present invention. The workload parametrization window may be presented by user interface module 129 to the user during step 510 shown in FIG. 5 before processing stage 1 in FIG. 3. As shown in FIG. 7, workload components selection 710 allows the user to manage items, collections and structures of items and how reports are gathered and statistics presented, for example. Further configurable parameters may offer other basic performance test aspects (number of users to simulate 720, start time 730, duration of the test 740, ramping of users, workflow rate, etc.). Other parameters allow configuring a read-only test, to specify secure user IDs and simulated users, and isolated test artifacts so as not to interfere with production data, i.e., "live" workflow data that may be generated in parallel to the performance data 125.

Figure 8:
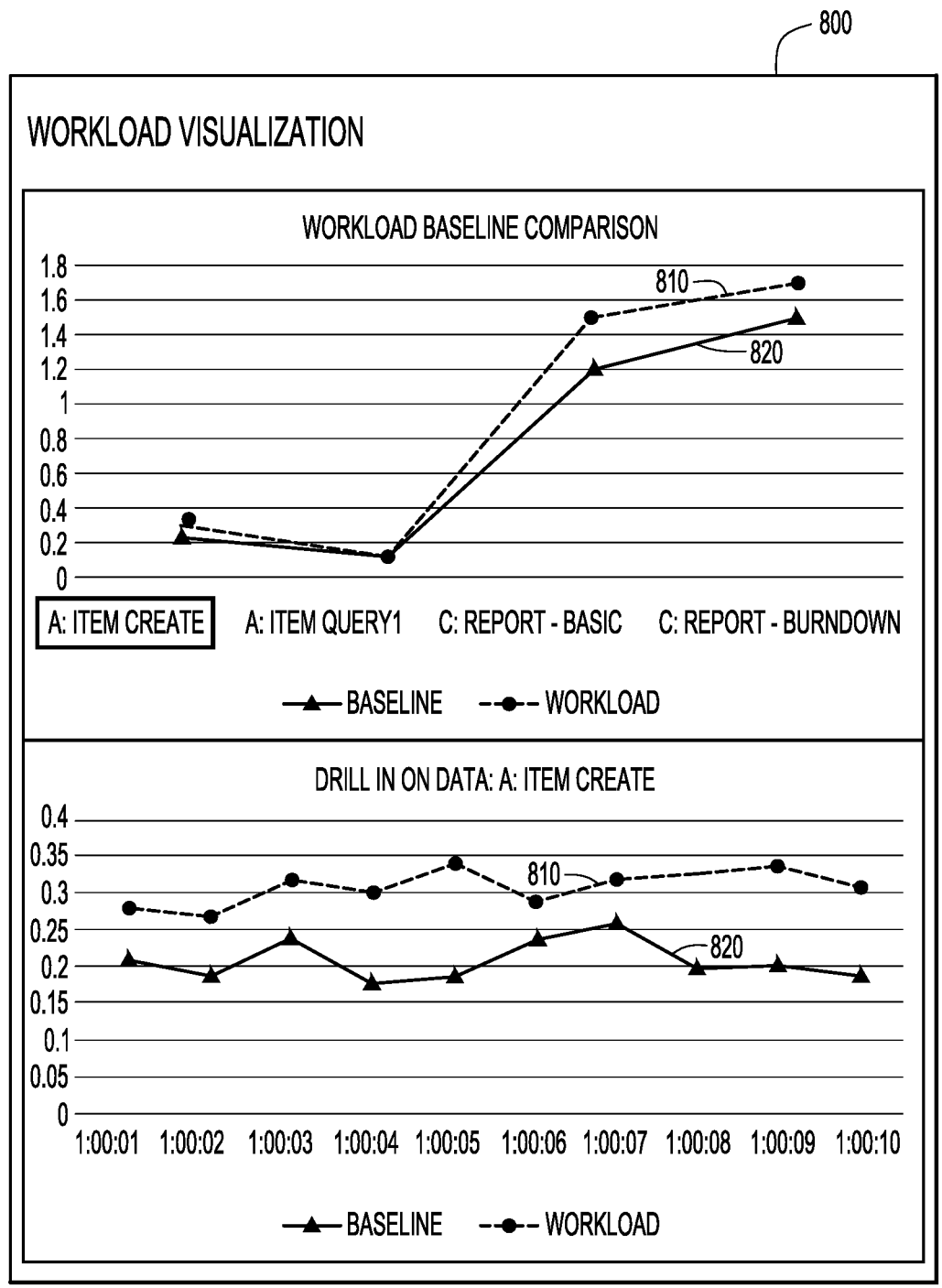
FIG. 8. is an illustration of workload visualization according to an example embodiment of the present invention.

FIG. 8. is an illustration of workload visualization window 800 according to an example embodiment of the present invention. Workload visualization window 800 may be displayed by user interface module 129 of client system 110. It may also be displayed by test result display module 148 of server system 130.

FIG. 8 shows workload test results 810, that are compared with baseline data 820 to determine a customer's performance for a set of transactions or operations for a given computer environment. In addition, a section "Drill in on Data" of the workload visualization window 800 is shown in which a number of created workload requests, transactions or operations over time is compared to a number of created baseline requests.

It will be appreciated that the embodiments described above and illustrated in the drawings represent only a few of the many ways of implementing embodiments for measuring performance of a computerized system.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, client authentication module 127, user interface module 129, server application module 143, server authentication module 147, test result display module 148, etc.). These systems may include any types of monitors and input devices (e.g., keyboard, mouse, voice recognition, etc.) to enter and/or view information.

It is to be understood that the software (e.g., client application module 121, client authentication module 127, user interface module 129, server application module 143, statistics collector module 145, server authentication module 147, test result display module 148, external authentication module 163 and external application module 165) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., client application module 121, client authentication module 127, user interface module 129, server application module 143, statistics collector module 145, server authentication module 147, test result display module 148, external authentication module 163 and external application module 165) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., workload definition 123 and application specific information). The database system may be implemented by any number of any conventional or other databases, data stores or storage structures (e.g., files, databases, data structures, data or other repositories, etc.) to store information (e.g., workload definition 123 and application specific information). The database system may be included within or coupled to the server and/or client systems. The database systems and/or storage structures may be remote from or local to the computer or other processing systems, and may store any desired data (e.g., performance data 125 and server performance data 149).

The present invention embodiments may employ any number of any type of user interface (e.g., Graphical User Interface (GUI), command-line, prompt, etc.) for obtaining or providing information (e.g., information to configure test component 122), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., test results and statistics, etc.).

The present invention embodiments are not limited to the specific tasks or algorithms described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of measuring performance of a computerized system comprising:
configuring a test component to generate an application specific workflow including a plurality of requests to be delivered to a computing environment of one or more computing devices to conduct a performance test for measuring the performance of the computerized system, wherein the computing environment operates in a live mode of operation and utilizes live processing to process requests from live workflows, wherein the test component is integrated in an application installed on the computing environment operating in the live mode of operation, and wherein configuring the test component comprises:
adjusting parameters to specify secure user IDs, simulated users, and configure a read-only test for the application specific workflow including an access restriction to production data for the application;
executing the integrated test component of the application to deliver the application specific workflow to the computing environment during the live mode of operation of the computing environment, wherein the plurality of requests of the application specific workflow from the integrated test component conduct the performance test and are processed as live requests along with requests from the live workflows by live processing of the computing environment to produce responses to the plurality of requests conducting the performance test; and
collecting performance data based on at least one response received from the computing environment as a result of the live processing of the application specific workflow from the integrated test component to measure the performance of the computerized system from execution of the application specific workflow during the live mode of operation.

2. The method of claim 1, wherein the one or more computing devices include a client system and a server system, and measuring the performance of the computerized system comprises:
generating the application specific workflow by sending the plurality of requests to the computing environment;
measuring response times for receiving responses to the plurality of requests from the computing environment and calculating the performance data; and
processing the performance data and sending the processed performance data to the server system.

3. The method of claim 2, further comprising:
authorizing the client system to enable execution of the integrated test component to measure the performance of the computerized system.

4. The method of claim 1, wherein configuring the test component comprises:
adjusting parameters of the application specific workflow for a desired performance measurement.

5. The method of claim 1, wherein configuring the test component comprises:
adjusting one or more parameters to alter at least one condition for execution of the application specific workflow.

6. The method of claim 5, wherein the at least one condition includes an access restriction to production data for the application.

7. The method of claim 1, wherein executing the integrated test component comprises:
executing the application specific workflow and measuring the performance of the computerized system in accordance with one or more from a group of a constant execution, a periodic time interval, and a time schedule.

8. The method of claim 1, wherein the application specific workflow is associated with a transaction, and measuring performance of the computerized system comprises:
measuring changes in performance of the transaction during a time interval.

9. The method of claim 1, further comprising:
resetting the one or more computing devices to a state occurring prior to execution of the application specific workflow.

10. The method of claim 1, further comprising:
monitoring execution of the application specific workflow to provide results of the measured performance of the computerized system.

11. A computer system for measuring performance of a computerized system comprising:
at least one processor configured to:
configure a test component to generate an application specific workflow including a plurality of requests to be delivered to a computing environment of one or more computing devices to conduct a performance test for measuring the performance of the computerized system, wherein the computing environment operates in a live mode of operation and utilizes live processing to process requests from live workflows, wherein the test component is integrated in an application installed on the computing environment operating in the live mode of operation, and wherein configuring the test component comprises:
adjusting parameters to specify secure user IDs, simulated users, and configure a read-only test for the application specific workflow including an access restriction to production data for the application;
execute the integrated test component of the application to deliver the application specific workflow to the computing environment during the live mode of operation of the computing environment, wherein the plurality of requests of the application specific workflow from the integrated test component conduct the performance test and are processed as live requests along with requests from the live workflows by live processing of the computing environment to produce responses to the plurality of requests conducting the performance test; and
collect performance data based on at least one response received from the computing environment as a result of the live processing of the application specific workflow from the integrated test component to measure the performance of the computerized system from execution of the application specific workflow during the live mode of operation.

12. The computer system of claim 11, wherein the one or more computing devices include a client system and a server system, and measuring the performance of the computerized system comprises:
generating the application specific workflow by sending the plurality of requests to the computing environment;
measuring response times for receiving responses to the plurality of requests from the computing environment and calculating the performance data; and
processing the performance data and sending the processed performance data to the server system.

13. The computer system of claim 12, wherein the at least one processor is further configured to:
authorize the client system to enable execution of the integrated test component to measure the performance of the computerized system.

14. The computer system of claim 11, wherein the at least one processor is further configured to:
adjust parameters of the application specific workflow for a desired performance measurement; and
adjust one or more parameters to alter at least one condition for execution of the application specific workflow, wherein the at least one condition includes an access restriction to production data for the application.

15. The computer system of claim 11, wherein the at least one processor is further configured to:
  execute the application specific workflow and measure the performance of the computerized system in accordance with one or more from a group of a constant execution, a periodic time interval, and a time schedule.

16. The computer system of claim 11, wherein the application specific workflow is associated with a transaction, and
  wherein the at least one processor is further configured to:
    measure changes in performance of the transaction during a time interval;
    reset the one or more computing devices to a state occurring prior to execution of the application specific workflow; and
    monitor execution of the application specific workflow to provide results of the measured performance of the computerized system.

17. A computer program product for measuring performance of a computerized system comprising:
  a computer readable storage medium having computer readable program code embodied therewith, the computer readable program code comprising computer readable program code configured to:
    configure a test component to generate an application specific workflow including a plurality of requests to be delivered to a computing environment of one or more computing devices to conduct a performance test for measuring the performance of the computerized system, wherein the computing environment operates in a live mode of operation and utilizes live processing to process requests from live workflows, wherein the test component is integrated in an application installed on the computing environment operating in the live mode of operation, and wherein configuring the test component comprises:
      adjusting parameters to specify secure user IDs, simulated users, and configure a read-only test for the application specific workflow including an access restriction to production data for the application;
    execute the integrated test component of the application to deliver the application specific workflow to the computing environment during the live mode of operation of the computing environment, wherein the plurality of requests of the application specific workflow from the integrated test component conduct the performance test and are processed as live requests along with requests from the live workflows by live processing of the computing environment to produce responses to the plurality of requests conducting the performance test; and
    collect performance data based on at least one response received from the computing environment as a result of the live processing of the application specific workflow from the integrated test component to measure the performance of the computerized system from execution of the application specific workflow during the live mode of operation.

18. The computer program product of claim 17, wherein the one or more computing devices include a client system and a server system, and measuring the performance of the computerized system comprises:
  generating the application specific workflow by sending the plurality of requests to the computing environment;
  measuring response times for receiving responses to the plurality of requests from the computing environment and calculating the performance data; and
  processing the performance data and sending the processed performance data to the server system.

19. The computer program product of claim 18, wherein the computer readable program code is further configured to:
  authorize the client system to enable execution of the integrated test component to measure the performance of the computerized system;
  adjust parameters of the application specific workflow for a desired performance measurement;
  adjust one or more parameters to alter at least one condition for execution of the application specific workflow, wherein the at least one condition includes an access restriction to production data for the application; and
  execute the application specific workflow and measure the performance of the computerized system in accordance with one or more from a group of a constant execution, a periodic time interval, and a time schedule.

20. The computer program product of claim 17, wherein the application specific workflow is associated with a transaction and the computer readable program code is further configured to:
  measure changes in performance of the transaction during a time interval;
  reset the one or more computing devices to a state occurring prior to execution of the application specific workflow; and
  monitor execution of the application specific workflow to provide results of the measured performance of the computerized system.

* * * * *